(12) United States Patent
Zhang

(10) Patent No.: US 11,788,483 B1
(45) Date of Patent: Oct. 17, 2023

(54) METHOD AND SYSTEM FOR STARTING AN ENGINE

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/810,919

(22) Filed: Jul. 6, 2022

(51) Int. Cl.
*F02D 41/40* (2006.01)
*F02D 41/06* (2006.01)
*F02D 13/02* (2006.01)

(52) U.S. Cl.
CPC ....... *F02D 41/064* (2013.01); *F02D 13/0215* (2013.01); *F02D 41/402* (2013.01); *F02D 2013/0292* (2013.01)

(58) Field of Classification Search
CPC .. F02D 41/064; F02D 41/402; F02D 13/0215; F02D 2013/0292
USPC ....... 123/260, 261, 275, 276, 299, 300, 491; 701/112, 113
See application file for complete search history.

(56) References Cited

U.S. PATENT DOCUMENTS

| | | | |
|---|---|---|---|
| 8,082,093 B2 | 12/2011 | Okada | |
| 9,382,857 B2 | 7/2016 | Glugla et al. | |
| 9,835,065 B2 | 12/2017 | Jozsa et al. | |
| 11,085,402 B1 * | 8/2021 | Vroman | F02M 23/04 |

FOREIGN PATENT DOCUMENTS

| | | | | |
|---|---|---|---|---|
| EP | 3561255 A1 | | 10/2019 | |
| WO | WO 8805861 | * | 8/1988 | ............... F02B 9/04 |
| WO | WO 2006018291 | * | 2/2006 | ............. F02B 19/10 |

* cited by examiner

*Primary Examiner* — Hai H Huynh
(74) *Attorney, Agent, or Firm* — Vincent Mastrogiacomo; McCoy Russell LLP

(57) ABSTRACT

Systems and methods for cold starting an internal combustion engine are described. In one example, the two amounts of fuel are injected into an engine cylinder during a cycle of the engine cylinder. The first amount of fuel is combusted to generate torque to rotate a crankshaft of the engine and the second amount of fuel is at least partially combusted in an exhaust system of the engine to increase exhaust gas temperature.

20 Claims, 4 Drawing Sheets

METHOD AND SYSTEM FOR STARTING AN ENGINE

FIELD

The present description relates to methods and a system for cold starting an internal combustion engine. The methods and systems may be particularly useful for vehicles that include an engine with cylinder pre-chambers.

BACKGROUND AND SUMMARY

An engine may be cold started after the engine has not operated for an extended period of time (e.g., eight hours). Cold starting the engine may result in higher emissions levels and reduced combustion stability. The higher emissions and reduced combustion stability may be due at least in part to fuel vaporization issues within the engine. In particular, fuel injected into cylinders of a cold engine may condense and form liquid fuel droplets when the fuel encounters cold engine components such as a piston. The liquid fuel droplets may not completely combust before being exhausted from the engine, thereby increasing engine emissions. In addition, an exhaust after treatment device positioned in an exhaust system of the engine may not be prepared to convert the hydrocarbons that have not combusted into $H_2O$ and $CO_2$. Therefore, it may be desirable to deliver a large amount of heat energy to the after treatment device as soon as possible after the engine is started without the engine generating higher emissions levels.

The inventor herein has recognized the above-mentioned issues and has developed a method for starting an engine, comprising: injecting a first amount of fuel during a cycle of a cylinder via a direct injector; injecting a second amount of fuel during the cycle to the cylinder via a pre-chamber; and supplying spark to the cylinder after injecting the first amount of fuel and before injecting the second amount fuel during the engine cycle.

By injecting a first amount of fuel to an engine cylinder during a cycle of the cylinder and combusting the injected fuel before injecting fuel to the engine cylinder a second time during the cycle of the cylinder, it may be possible to provide the technical result of increasing the speed of combustion in the cylinder and generating a higher temperature in the cylinder. In addition, timing of the first injection may be such that there may be less opportunity for the first amount of injected fuel to condense on the piston in the cylinder so that engine emissions may be reduced. The second amount of fuel may be injected to increase heat flux delivery to the exhaust system after treatment device.

The present description may provide several advantages. In particular, the approach may reduce emissions of engines that are cold started. In addition, the approach may provide stable combustion so that the engine may idle smoothly at a desired idle speed. Further, the approach may reduce an amount of time it takes for an exhaust after treatment device to reach a light-off temperature so vehicle tailpipe emissions may be reduced.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
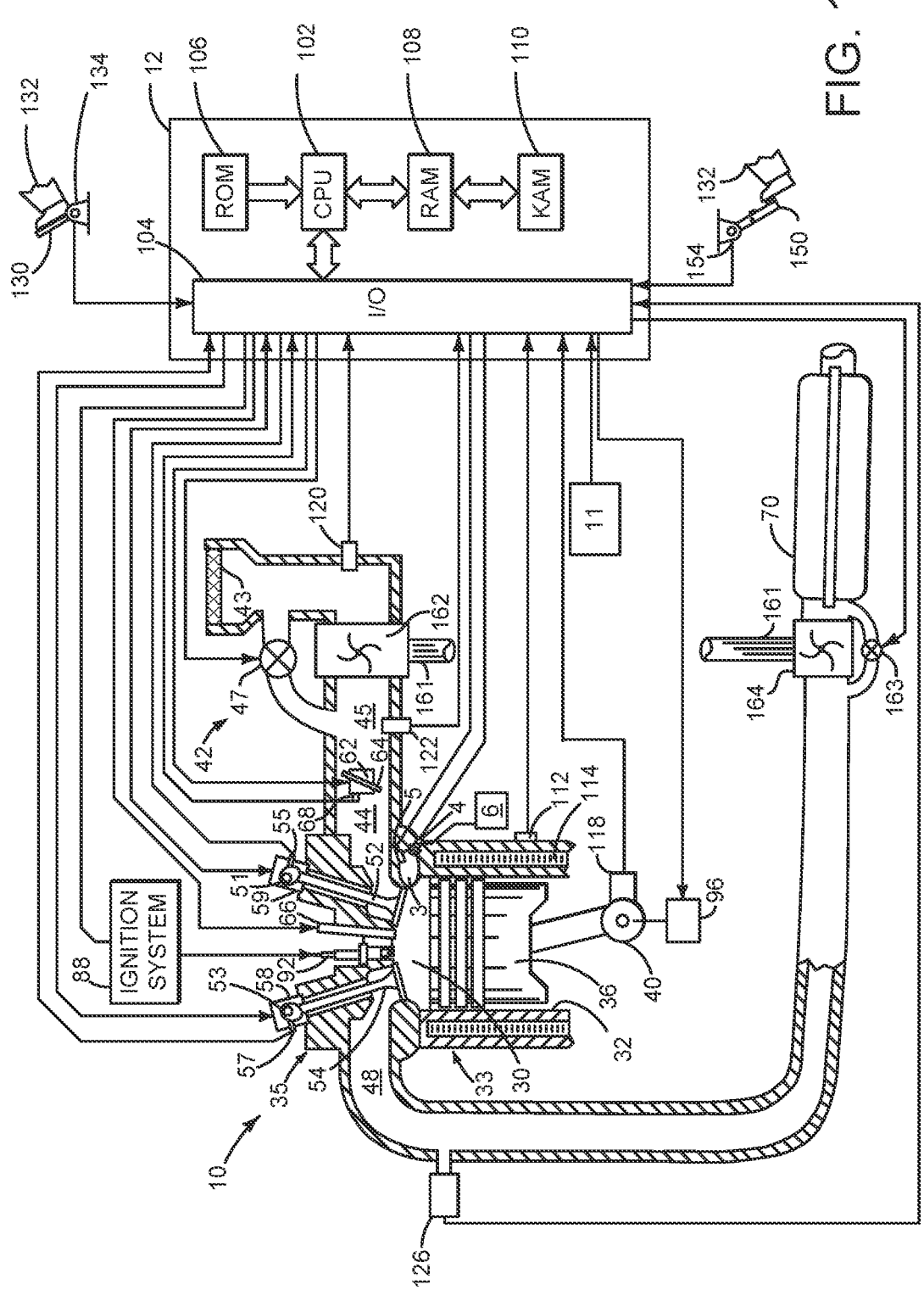
FIG. 1 is a schematic diagram of an engine.
Figure 2:
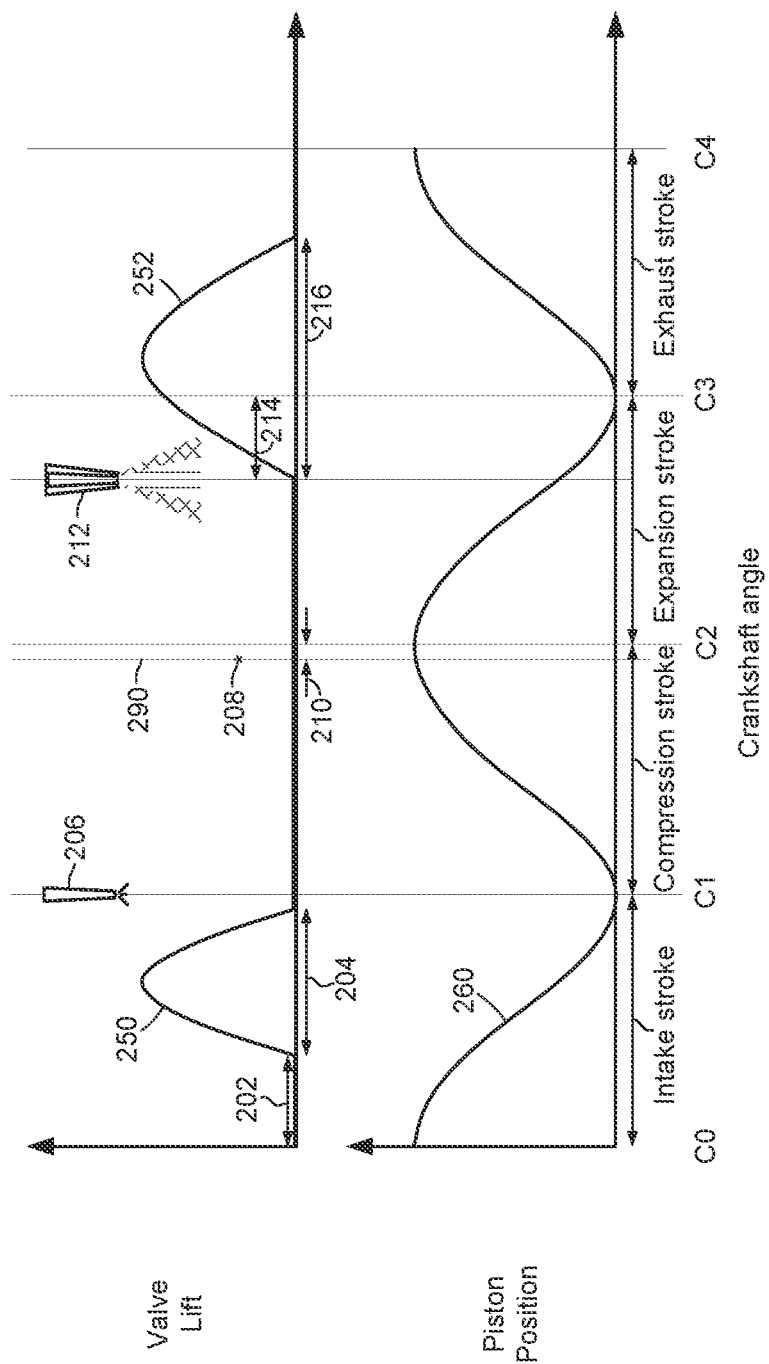
FIG. 2 shows an example cycle of a cylinder according to the present invention.
Figure 3:
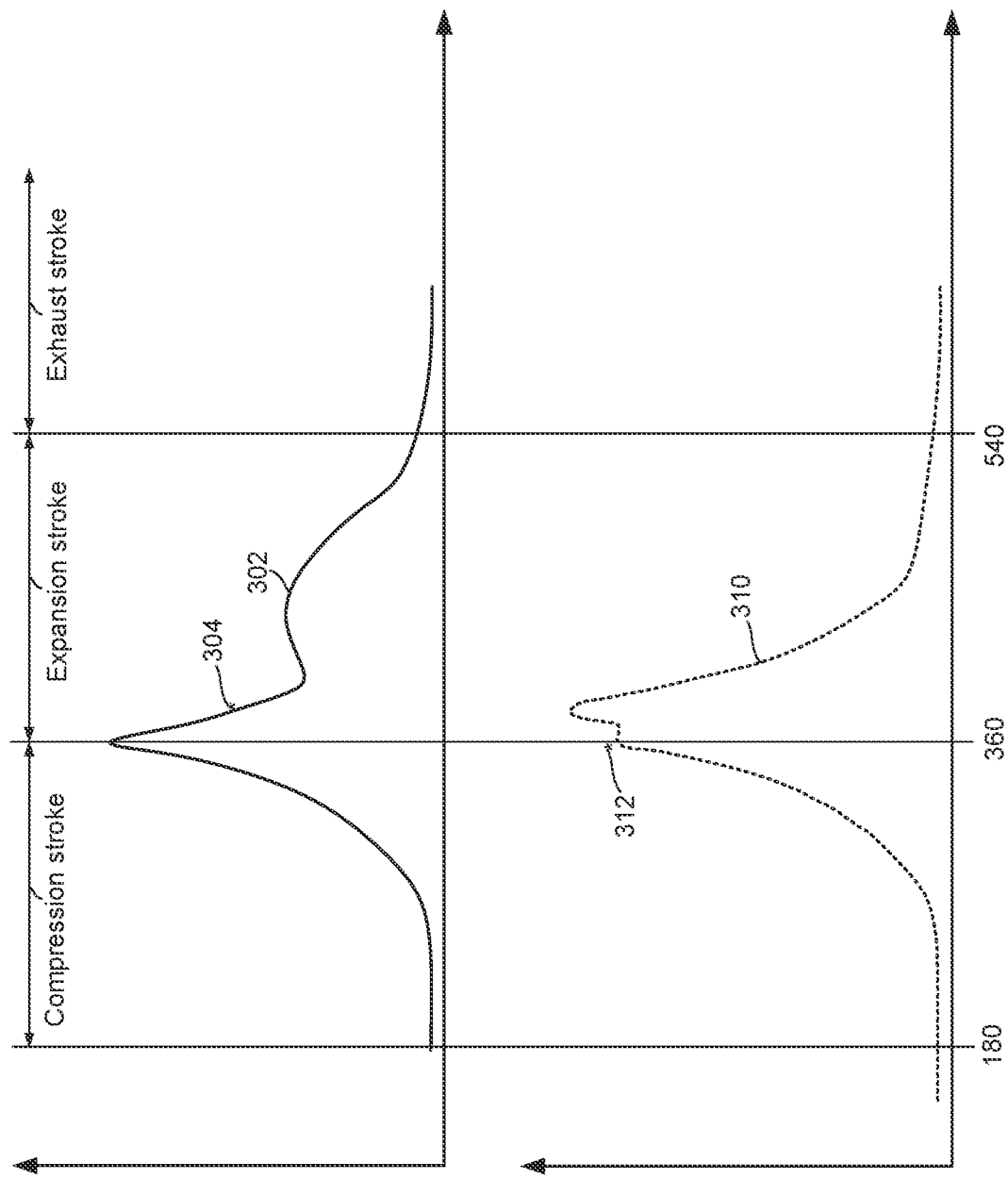
FIG. 3 shows a comparison of cylinder pressure for a cylinder that is operated according to an engine starting procedure that includes cold start spark retard and cylinder pressure for a cylinder that is operated according to the present invention.
Figure 4:
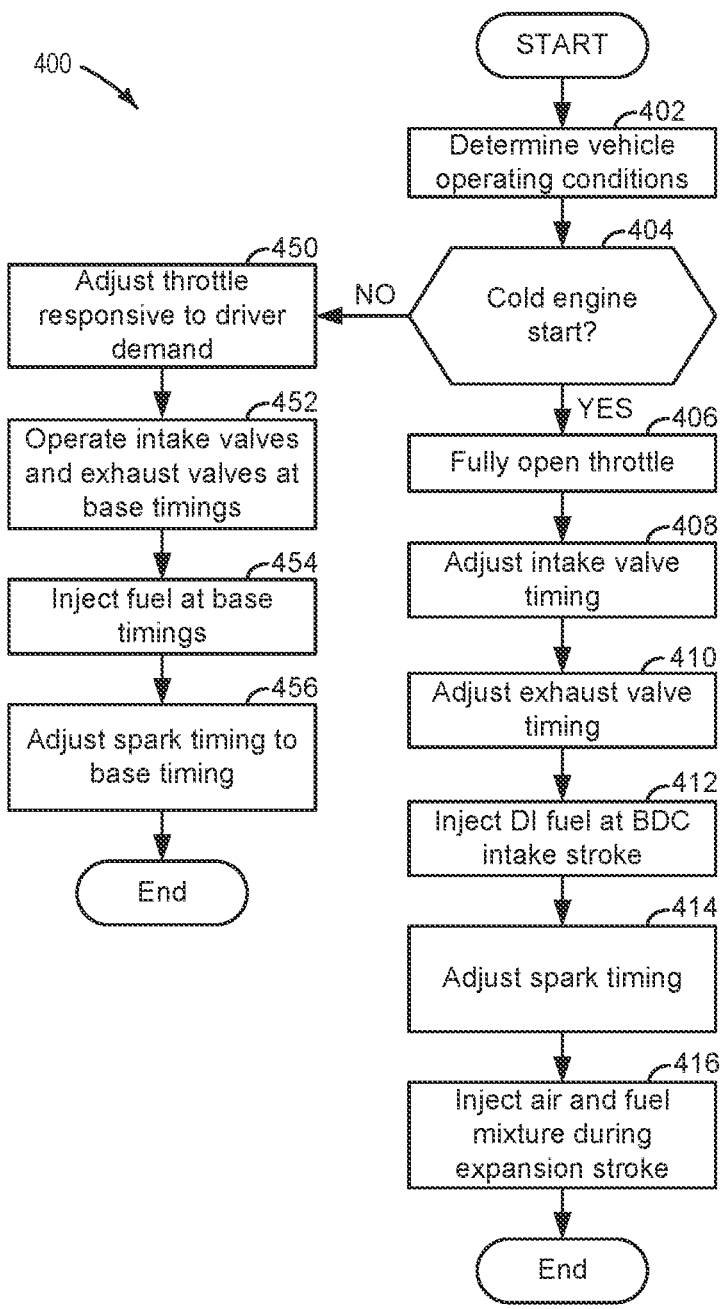
FIG. 4 shows a flowchart of a method for starting an engine.

The present description is related to improving cold starting of an engine. The present method for operating an engine injects fuel in a way that may reduce fuel puddle formation within a cylinder during engine starting. In particular, fuel may be injected to a cylinder when a piston of the cylinder is near bottom-dead-center intake stroke so that the injected fuel has less opportunity to condense on the cylinder's piston before the fuel is combusted. In addition, spark within the cylinder is generated when the piston is near top-dead-center compression stroke so that pressure rises in the cylinder after top-dead-center compression stroke, thereby improving combustion stability and increasing temperature within the cylinder. The method may be performed via an engine of the type that is shown in FIG. 1. The method may follow the sequence that is shown in FIG. 2. Cylinder pressure according to a cold start spark retard strategy and cylinder pressure according to the present method are shown in FIG. 3 for comparison purposes. Finally, a method for operating an engine when the engine is cold started is shown in FIG. 4.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2. The controller may employ the actuators shown in FIGS. 1 and 2 to adjust engine operation based on the received signals and instructions stored in memory of controller 12.

Engine 10 is comprised of cylinder head 35 and block 33, which include combustion chamber 30 and cylinder 32. Piston 36 is positioned therein and reciprocates via a connection to crankshaft 40. Starter 96 (e.g., an electric machine) may selectively engage engine crankshaft 40 during engine starting to rotate crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 is an adjustable valve such that timing (e.g., opening timing and closing timing) and lift may be adjusted or varied by valve adjustment mechanism 59. Exhaust valve 54 is an adjustable valve such that timing (e.g., opening timing and closing timing) and lift may be adjusted or varied by valve adjustment mechanism 58.

Pre-chamber 3 is shown external to and coupled to combustion chamber 30 and it may receive air via pre-chamber air injector 4. Air may be supplied to pre-chamber air injector 4 via a pump or pressure reservoir 6. Pre-chamber 3 also includes a fuel injector 5 for supplying fuel to pre-chamber 3. In some examples, pre-chamber 3 may be incorporated into cylinder head 35.

Direct fuel injector 66 is shown protruding into combustion chamber 30 and it is positioned to inject fuel directly into combustion chamber 30, which is known to those skilled in the art as direct injection. Direct fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor from an engine position sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface may be a touch screen display, pushbutton, key switch or other known device. Controller 12 may also automatically start engine 10 in response to vehicle and engine operating conditions. Automatic engine starting may include starting engine 10 without input from human 132 to a device that is dedicated to receive input from human 132 for the sole purpose of starting and/or stopping rotation of engine 10 (e.g., a key switch or pushbutton). For example, engine 10 may be automatically stopped in response to driver demand torque being less than a threshold and vehicle speed being less than a threshold.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Thus, the system of FIG. 1 provides for a system, comprising: an engine including a cylinder having an exhaust valve, a direct injector configured to inject fuel to the cylinder, a pre-chamber coupled to the cylinder, the pre-chamber including an air injector and a fuel injector; and a controller including executable instructions stored in non-transitory memory that cause the controller to inject a first amount of fuel via the direct injector during a cycle of the cylinder, and to inject a second amount of fuel via the pre-chamber and the fuel injector, the second amount of fuel injected when the exhaust valve is open. In a first example, the system further comprises a variable timed intake valve and additional instructions to begin opening the variable timed intake valve at or later than 60 crankshaft degrees after top-dead-center intake stroke of the cylinder. In a second example that may include the first example, the system further comprises additional instructions to fully close the variable timed intake valve at or before bottom-dead-center intake stroke of the cylinder. In a third example that may include one or both of the first and second examples, the system further comprises additional instructions to begin opening the exhaust valve beginning at or later than 60 crankshaft degrees before top-dead-center exhaust stroke of the cylinder. In a fourth example that may include one or more of the first through third examples, the system further comprises additional instructions to fully close the exhaust valve at or before than 60 crankshaft degrees before bottom-dead-center exhaust stroke of the cylinder. In a fifth example that may include one or more of the first through fourth examples, the system further comprises additional instructions to supply spark to the cylinder during the cycle of the cylinder after injecting the first amount of fuel and before injecting the second amount of fuel.

FIG. 2 is an engine operating sequence during a cycle of a cylinder of an engine while the engine is being cold started according to the method of FIG. 4. The sequence of FIG. 2 may be provided by the system of FIG. 1 in cooperation with the method of FIG. 4. The first plot and the second plot are aligned with respect to crankshaft position. The vertical lines C0-C4 represent locations where the piston of the displayed cylinder is at top-dead-center or bottom dead center.

The first plot from the top of FIG. 2 is a plot that shows intake and exhaust valve trajectories of a cylinder of an engine during an engine cold start. The vertical axis represents poppet valve lift and poppet valve lift increases in the direction of the vertical axis arrow. The horizontal axis represents engine crankshaft position and the strokes of the cylinder are labeled. Trace 250 represents an intake valve lift amount. Trace 252 represents exhaust valve lift amount.

The second plot from the top of FIG. 2 is a plot that shows piston position of the cylinder of the engine during an engine cold start. The vertical axis represents piston position and piston position varies with engine crankshaft position. The horizontal axis represents engine crankshaft position and the strokes of the cylinder are labeled. Trace 260 represents the cylinder's piston trajectory during the cylinder cycle.

At crankshaft position C0, the piston is at top-dead-center intake stroke. The intake and exhaust valves are fully closed. Fuel is not being injected to the cylinder and spark is not delivered to the cylinder. At substantially 60 crankshaft degrees (e.g., within ±5 crankshaft degrees of 60 crankshaft degrees after top-dead-center intake stroke of the cylinder) after top-dead-center intake stroke of the cylinder, the intake valve or valves of the cylinder begin to open. Thus, the intake valve opening timing is retarded, or late, so that air flow into the cylinder may be regulated to control torque that may be generated by the cylinder while the engine is operating at wide open throttle. Leader 202 represents the 60 crankshaft degrees. The intake valve opens and then is fully closed at substantially 100 crankshaft degrees after the intake valve began to open as indicated by leader 204. The short duration intake valve opening timing also operates to limit air flow into the cylinder and the amount of torque that the cylinder may generate.

A first amount of fuel is directly injected as indicated at 206 such that half the amount of fuel that is directly injected is directly injected before bottom-dead-center intake stroke of the cylinder and the remaining amount of fuel that is directly injected during the cylinder cycle is directly injected after bottom-dead-center intake stroke of the cylinder. Thus, the directly injected fuel may be injected centered substantially about bottom-dead-center of the intake stroke (e.g., within ±10 crankshaft degrees of bottom-dead-center intake stroke of the cylinder). At least a portion of the fuel may be injected while the intake valve is open during the cylinder cycle. By directly injecting fuel when the cylinder is at bottom-dead-center intake stroke, it may be possible to reduce an amount of fuel that contacts the cylinder's piston and condenses in the cylinder to form puddles. Therefore, engine emissions may be reduced. The first amount of fuel that is injected into the cylinder may mix with air that is in the cylinder to produce a stoichiometric or lean air-fuel mixture.

At approximately 6 crankshaft degrees before top-dead-center compression stroke of the cylinder, spark is generated in the cylinder as indicated by the asterisk * at 208. The spark initiates combustion in the cylinder and pressure in the cylinder increases above a level that is present at top-dead-center compression stroke of the cylinder. The advanced timing of spark, causes temperature within the cylinder to increase and provide more complete combustion of the air-fuel mixture. The advanced spark timing provides for faster combustion and higher in cylinder pressure than cold start spark retard strategies. The engine crankshaft continues to rotate. The amount of spark advance in crankshaft degrees is indicated at 210. Vertical line 290 represents the location of the spark timing.

A second amount of fuel is injected into a pre-chamber and the pre-chamber releases the injected fuel to the cylinder as indicated at 212 such that half the amount of fuel that is injected is injected before 60 crankshaft degrees before bottom-dead-center expansion stroke of the cylinder and the remaining amount of fuel that is injected during the cylinder cycle is injected after 60 crankshaft degrees before bottom-dead-center expansion stroke of the cylinder. Thus, the pre-chamber injected fuel may be injected centered substantially about 60 crankshaft degrees before bottom-dead-center of the expansion stroke (e.g., within ±10 crankshaft degrees of 60 degrees before bottom-dead-center expansion stroke of the cylinder). At least a portion of the fuel may be injected while the exhaust valve is open during the cylinder cycle. By injecting fuel into the pre-chamber when the cylinder is approaching bottom-dead-center expansion stroke, it may be possible to heat exhaust system components while reducing heat transfer to engine components, thereby reducing an amount of time it takes for an after treatment device to reach light-off temperature. Consequently, engine tailpipe emissions may be reduced. Air may also be injected to the cylinder via an air injector and the pre-chamber. The second amount of fuel that is injected into the cylinder may mix with the air that is injected into the cylinder to produce a stoichiometric or lean air-fuel mixture in the cylinder. The second amount of fuel may combust late in the cylinder cycle so that a greater amount of heat generated by the second amount of fuel may be used to heat an after treatment device rather than the engine.

The cylinder's exhaust valve begins to open during the cylinder cycle at substantially 60 crankshaft degrees before bottom-dead-center expansion stroke (e.g., within +10 crankshaft degrees of 60 degrees before bottom-dead-center expansion stroke of the cylinder) as indicated by the leader at 214. The cylinder's exhaust valve begins to close during the cylinder cycle at substantially 60 crankshaft degrees before top-dead-center exhaust stroke (e.g., within ±10 crankshaft degrees of 60 degrees before top-dead-center exhaust stroke of the cylinder). This advanced exhaust valve timing allows the fuel and air that is injected via the pre-chamber to combust in the cylinder and in the exhaust system, thereby increasing the amount of heat that is delivered to the exhaust after treatment device. The exhaust valve is open for approximately 180 crankshaft degrees as indicated by leader 216.

In this way, a first air-fuel mixture may be combusted in a cylinder to generate torque to rotate the engine while a second amount of fuel and air may be combusted in the cylinder and in the engine's exhaust system to increase heat delivery to an after treatment device. In addition, combustion within the cylinder may be initiated by a spark that is timed to produce a rapid combustion rate that may improve combustion stability and reduce hydrocarbon emissions.

Referring now to FIG. 3, two plots of cylinder pressures are shown. The first plot from the top of FIG. 3 is a plot of prior art cylinder pressure in an engine cylinder that is operated with cold start spark retard. The second plot from the top of FIG. 3 is a plot of cylinder pressure in an engine cylinder that is operated according to the method of FIG. 4. The first and second plots are aligned in crankshaft degrees.

The vertical axis of the first plot from the top of FIG. 3 represents cylinder pressure and cylinder pressure increases in the direction of the vertical axis arrow. The horizontal axis represents engine crankshaft angle and the engine crankshaft angle increases from the left side of the plot to the right side of the plot. Trace 302 represents prior art cylinder pressure and the asterisk * 304 represents when spark is supplied to the cylinder to initiate combustion within the cylinder.

The vertical axis of the second plot from the top of FIG. 3 represents cylinder pressure and cylinder pressure increases in the direction of the vertical axis arrow. The horizontal axis represents engine crankshaft angle and the engine crankshaft angle increases from the left side of the plot to the right side of the plot. Trace 310 represents cylinder pressure and the asterisk * 312 represents when spark is supplied to the cylinder to initiate combustion within the cylinder.

In the first plot from the top of FIG. 3, the cylinder pressure rises and it peaks at top-dead-center compression stroke. Spark is delivered after top-dead-center compression stroke and it ignites an air-fuel mixture in the cylinder that burns late and it releases energy as indicated by the second hump in the pressure trace (e.g., the hump that is at about 450 crankshaft degrees). Consequently, some heat that is generated by combusting the air-fuel mixture goes into heating the engine.

In the second plot from the top of FIG. 3, the cylinder pressure rises and it peaks at top-dead-center compression stroke, but a second higher peak is generated after top-dead-center compression stroke after spark is delivered late in the compression stroke as indicated by the asterisk 312. The air-fuel mixture is ignited causing pressure in the cylinder to exceed pressure in the cylinder when the cylinder reaches top-dead-center compression stroke. This spark timing causes the air-fuel mixture to burn faster and at a higher temperature. A second injection of fuel and air occurs during the late part of the expansion stroke (not shown), but pressure in the cylinder does not rise much due to the exhaust valve being open (not shown) and the late combustion of the second air and fuel mixture. The second pressure profile may also be more repeatable since combustion stability is improved in the cylinder that is delivered spark with advanced timing.

Referring now to FIG. 4, a flow chart of a method for cold starting an engine is shown. The method of FIG. 4 may be incorporated into and may cooperate with the system of FIG. 1. Further, at least portions of the method of FIG. 4 may be incorporated as executable instructions stored in non-transitory memory while other portions of the method may be performed via a controller transforming operating states of devices and actuators in the physical world. Method 400 describes actions taken during a single cylinder cycle of an engine for a single cylinder of the engine. Method 400 may be repeated for each of the engine's other cylinders and method 400 may be performed for each engine cylinder during each cylinder cycle.

At 402, method 400 determines operation conditions. Operating conditions may include, but are not limited to ambient temperature, engine temperature, barometric pressure, driver demand torque or power, and engine oil temperature. The engine operating conditions may be determined via the various sensors described herein. Method 400 proceeds to 404.

At 404, method 400 judges if a cold engine start (e.g., start of an engine when engine temperature is less than a threshold temperature, such as 20 degrees Celsius) is requested. An engine start may be requested via a human providing input to a controller, via a controller, or via a signal from a remote device (e.g., key fob). If method 400 determines that there is an engine start is requested, the answer is yes and method 400 proceeds to 406. Otherwise, the answer is no and method 400 proceeds to 450.

At 450, method 400 adjusts a position of the engine throttle according to a driver demand torque or power. In one example, the throttle is adjusted to provide an amount of air with which the engine may generate the requested engine torque or power at a predetermined air-fuel ratio (e.g., a stoichiometric air-fuel ratio). Method 400 proceeds to 452.

At 452, method 400 operates intake valves and exhaust valves at base opening and closing timings. The base opening timings and closing timings may be a function of engine speed and engine load. Further, the base opening timings and closing timings may be empirically determined and stored in a table or function that may be referenced according to engine speed and load. Method 400 adjusts intake and exhaust valve timings to their respective base timings and proceeds to 454.

At 454, method 400 directly injects fuel to the engine cylinder. In one example, the amount of fuel that is injected is based on a driver demand torque or power and a desired engine air-fuel ratio. In one example, method 400 may reference a table or function that includes empirically determined fuel amounts as a function of driver demand torque or power and engine speed. Method 400 injects the amount of fuel that is output from the table or function. Method 400 proceeds to 456.

At 456, method 400 adjusts cylinder spark timing to the cylinder's base spark timing. In one example, the cylinder's base spark timing is extracted from a table or function of empirically determined values. Method 400 proceeds to exit.

At 406, method 400 opens the engine's throttle. Method 400 may fully open the engine's throttle, or alternatively, method 400 may open the throttle to be open 50% or more of fully open. Method 400 fully opens the throttle so that engine air flow will be regulated according to intake valve timing. This allows the engine to use only half the air used by the engine if the engine were operated with a cold start spark retard strategy. Method 400 proceeds to 408.

At 408, method 400 adjusts intake valve timing. In one example, method 400 begins intake valve opening timing at substantially 60 crankshaft degrees after top-dead-center intake stroke of the cylinder that includes the intake valve. As a result, the intake valve opening timing is retarded, or late, so that air flow into the cylinder may be regulated to control torque that may be generated by the cylinder while the engine is operating at wide open throttle. The cylinder's intake valves are fully closed at substantially 100 crankshaft degrees after the cylinder's intake valves began to open. Method 400 proceeds to 410.

At 410, method 400 adjusts exhaust valve timing. In one example, method 400 begins exhaust valve opening timing at substantially 60 crankshaft degrees before bottom-dead-center expansion stroke of the cylinder that includes the exhaust valve. As a result, the exhaust valve opening timing is advanced, or early, so that exhaust gases may spend less time warming the engine and more time warming the engine's exhaust gas treatment devices. The cylinder's exhaust valves are fully closed at substantially 180 crankshaft degrees after the exhaust valves of the cylinder began to open. Method 400 proceeds to 412.

At 412, method 400 directly injects a first amount of fuel into the cylinder. The first amount of fuel may be an amount of fuel that provides a stoichiometric or slightly lean air-fuel (e.g., 1.08. Lambda (equivalence ratio)) mixture in the engine cylinder. In one example, the directly injected fuel is injected such that half the amount of fuel that is directly injected is directly injected before bottom-dead-center intake stroke of the cylinder and the remaining amount of fuel that is directly injected during the cylinder cycle is directly injected after bottom-dead-center intake stroke of the cylinder. As a result, the directly injected fuel may be injected centered substantially about bottom-dead-center of the intake stroke (e.g., within ±10 crankshaft degrees of bottom-dead-center intake stroke of the cylinder). Injecting fuel at this time may reduce fuel puddling in the cylinder so that engine hydrocarbons may be reduced. Method 400 proceeds to 414.

At 414, method 400 adjusts spark timing for the cylinder. In one example, the spark timing is adjusted to top-dead-center compression stroke or up to 10 crankshaft degrees advanced of top-dead-center compression stroke. Delivering the spark at this timing with the fuel timing described herein allows the first amount of fuel injected to combust quickly and with fewer residual hydrocarbons so that engine emissions may be reduced. Method 400 proceeds to 416.

At 416, method 400 injects a second fuel amount and air into the engine cylinder that previously received the first amount of fuel. The second amount of fuel and the air may be injected into a pre-chamber and the pre-chamber releases the injected fuel to the cylinder such that half the amount of fuel that is injected is injected before 60 crankshaft degrees before bottom-dead-center expansion stroke of the cylinder and the remaining amount of fuel that is injected during the cylinder cycle is injected after 60 crankshaft degrees before bottom-dead-center expansion stroke of the cylinder. As such, the pre-chamber injected fuel may be injected centered substantially about 60 crankshaft degrees before bottom-dead-center of the expansion stroke (e.g., within ±10 crankshaft degrees of 60 degrees before bottom-dead-center expansion stroke of the cylinder). At least a portion of the fuel may be injected while the exhaust valve is open during the cylinder cycle. By injecting fuel into the pre-chamber when the cylinder is approaching bottom-dead-center expansion stroke, it may be possible to heat exhaust system components while reducing heat transfer to engine components, thereby reducing an amount of time it takes for an after treatment device to reach light-off temperature. Method 400 proceeds to exit.

In this way, a first fuel charge may provide torque to rotate the engine and heat to combust a second fuel charge that may be combusted and released into an engine's exhaust system to heat an after treatment device. Further, the spark timing may help to improve combustion stability and reduce hydrocarbon emissions.

Thus, the method of FIG. 4 provides for a method for starting an engine, comprising: injecting a first amount of fuel during a cycle of a cylinder via a direct injector; injecting a second amount of fuel during the cycle to the cylinder via a pre-chamber; and supplying spark to the cylinder after injecting the first amount of fuel and before injecting the second amount fuel during the engine cycle. In a first example, the method includes where the pre-chamber includes a fuel injector and an air injector. In a second example that may include the first example, the method includes where the engine includes a throttle, and further comprising: operating the engine with the throttle being more than 50% open during the engine cycle. In a third example that may include one or both of the first and second examples, the method includes where at least a portion of the first amount of fuel is injected during an intake stroke of the cylinder. In a fourth example that may include one or more of the first through third examples, the method includes where at least a portion of the first amount of fuel is injected at bottom-dead-center intake stroke of the cylinder. In a fifth example that may include one or more of the first through fourth examples, the method includes where the second amount of fuel is injected during an expansion stroke of the cylinder during the cycle. In a sixth example that may include one or more of the first through fifth examples, the method further comprising injecting air to the cylinder via the pre-chamber while injecting the second amount of fuel. In a seventh example that may include one or more of the first through sixth examples, the method includes where the first amount of fuel injected is combusted as part of a stoichiometric or lean air-fuel mixture. In a sixth example that may include one or more of the first through fifth examples, the method includes where the second amount of fuel is injected when one or more exhaust valves of the cylinder are open.

The method of FIG. 4 also provides for a method for starting an engine, comprising: fully opening an engine throttle, beginning to open an intake valve of a cylinder 60 crankshaft degrees after top-dead-center intake stroke of a cylinder that includes the intake valve, directly injecting a first amount of fuel to the cylinder, and injecting a second amount of fuel to the cylinder via a pre-chamber. In a first example, the method further comprising beginning to open an exhaust valve of the cylinder 60 crankshaft degrees before bottom-dead-center expansion stroke of the cylinder. In a second example that may include the first example, the method further comprising injecting air to the cylinder via the pre-chamber while injecting the second amount of fuel. In a third example that may include one or both of the first and second examples, the method further comprising supplying spark to the cylinder after injecting the first amount of fuel and before injecting the second amount of fuel. In a fourth example that may include one or more of the first through third examples, the method includes where the first amount of fuel is combusted as part of a stoichiometric or lean air-fuel mixture.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, I6, V6, V8, V10, and V12 engines operating in natural gas, gasoline, or alternative fuel configurations could use the present description to advantage.

The invention claimed is:

1. A method for starting an engine, comprising:
   injecting a first amount of fuel during a cycle of a cylinder via a direct injector;
   injecting a second amount of fuel during the cycle to the cylinder via a pre-chamber; and
   supplying spark to the cylinder after injecting the first amount of fuel and before injecting the second amount of fuel during the cycle of the cylinder.

2. The method of claim 1, where the pre-chamber includes a fuel injector and an air injector.

3. The method of claim 2, where the engine includes a throttle, and further comprising:
   operating the engine with the throttle being more than 50% open during the cycle of the cylinder.

4. The method of claim 2, where at least a portion of the first amount of fuel is injected during an intake stroke of the cylinder.

5. The method of claim 2, where at least a portion of the first amount of fuel is injected at bottom-dead-center intake stroke of the cylinder.

6. The method of claim 5, where the second amount of fuel is injected during an expansion stroke of the cylinder during the cycle.

7. The method of claim 6, further comprising injecting air to the cylinder via the pre-chamber while injecting the second amount of fuel.

8. The method of claim 7, where the first amount of fuel injected is combusted as part of a stoichiometric or lean air-fuel mixture.

9. The method of claim 1, where the second amount of fuel is injected when one or more exhaust valves of the cylinder are open.

10. A system, comprising:
    an engine including a cylinder having an exhaust valve, a direct injector configured to inject fuel to the cylinder, a pre-chamber coupled to the cylinder, the pre-chamber including an air injector and a fuel injector; and
    a controller including executable instructions stored in non-transitory memory that cause the controller to inject a first amount of fuel via the direct injector during a cycle of the cylinder, and to inject a second amount of fuel via the pre-chamber and the fuel injector, the second amount of fuel injected when the exhaust valve is open.

11. The system of claim 10, further comprising a variable timed intake valve and additional instructions to begin opening the variable timed intake valve at or later than 60 crankshaft degrees after top-dead-center intake stroke of the cylinder.

12. The system of claim 11, further comprising additional instructions to fully close the variable timed intake valve at or before bottom-dead-center intake stroke of the cylinder.

13. The system of claim 12, further comprising additional instructions to begin opening the exhaust valve beginning at or later than 60 crankshaft degrees before top-dead-center exhaust stroke of the cylinder.

14. The system of claim 13, further comprising additional instructions to fully close the exhaust valve at or before than 60 crankshaft degrees before bottom-dead-center exhaust stroke of the cylinder.

15. The system of claim 14, further comprising additional instructions to supply spark to the cylinder during the cycle of the cylinder after injecting the first amount of fuel and before injecting the second amount of fuel.

16. A method for starting an engine, comprising:
    fully opening an engine throttle, beginning to open an intake valve of a cylinder 60 crankshaft degrees after top-dead-center intake stroke of the cylinder that includes the intake valve, directly injecting a first amount of fuel to the cylinder, and injecting a second amount of fuel to the cylinder via a pre-chamber.

17. The method of claim 16, further comprising beginning to open an exhaust valve of the cylinder 60 crankshaft degrees before bottom-dead-center expansion stroke of the cylinder.

18. The method of claim 17, further comprising injecting air to the cylinder via the pre-chamber while injecting the second amount of fuel.

19. The method of claim 18, further comprising supplying spark to the cylinder after injecting the first amount of fuel and before injecting the second amount of fuel.

20. The method of claim 19, where the first amount of fuel is combusted as part of a stoichiometric or lean air-fuel mixture.

* * * * *